United States Patent
Waltermann et al.

(10) Patent No.: US 9,934,044 B2
(45) Date of Patent: Apr. 3, 2018

(54) METHODS FOR CUSTOMIZING AN OPERATING SYSTEM AT AN INFORMATION HANDLING DEVICE

(75) Inventors: Rod D. Waltermann, Rougemont, NC (US); Nathan J. Peterson, Durham, NC (US); Richard Paul Cornwell, Durham, NC (US); Bruce Douglas Gress, Raleigh, NC (US); Jun Li, Cary, NC (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 213 days.

(21) Appl. No.: 13/435,452

(22) Filed: Mar. 30, 2012

(65) Prior Publication Data
US 2013/0268743 A1    Oct. 10, 2013

(51) Int. Cl.
*G06F 9/44*       (2006.01)
*G06F 9/445*      (2006.01)

(52) U.S. Cl.
CPC . *G06F 9/44* (2013.01); *G06F 8/60* (2013.01)

(58) Field of Classification Search
USPC .......................................................... 717/169
See application file for complete search history.

(56) References Cited

U.S. PATENT DOCUMENTS

| | | | | |
|---|---|---|---|---|
| 6,343,360 B1* | 1/2002 | Feinleib | ............... | G06F 9/44505 713/1 |
| 6,922,831 B1* | 7/2005 | Kroening | ................... | G06F 8/60 717/172 |
| 7,509,644 B2* | 3/2009 | Worley, Jr. | ............... | G06F 9/468 713/164 |
| 7,853,945 B2* | 12/2010 | Kramer | ..................... | G06F 8/63 709/203 |
| 8,214,631 B2* | 7/2012 | Samba | ................. | G06F 9/44505 713/1 |
| 8,239,662 B1* | 8/2012 | Nelson | ................... | G06F 9/4416 713/1 |
| 8,341,387 B2* | 12/2012 | Hentosh | ................ | G06F 9/4401 713/1 |

(Continued)

FOREIGN PATENT DOCUMENTS

WO    WO 2010005803 A2 *  1/2010  ............... G06F 1/24

OTHER PUBLICATIONS

Authors et al.: Disclosed Anonymously, IP.com No. IPCOM000208801D, Publication: Jul. 18, 2011.*

(Continued)

*Primary Examiner* — Hossain Morshed
(74) *Attorney, Agent, or Firm* — Ference & Associates LLC

(57) ABSTRACT

Systems, methods and products directed toward creating device preloads via employing base and additional operating system content. One aspect includes communicating an aspect of an information handling device, and assimilating additional operating system content at the information handling device responsive to communication of the aspect of the device, the additional operating system content deriving from a repository separate from the information handling device, wherein a base operating system and additional operating system content combine to form a unitary device operating system. Other embodiments are described herein.

16 Claims, 8 Drawing Sheets

(56) References Cited

U.S. PATENT DOCUMENTS

| | | | | |
|---|---|---|---|---|
| 8,464,241 | B2* | 6/2013 | Hayton | G06F 8/68 707/623 |
| 8,898,659 | B2* | 11/2014 | Dandekar | G06F 9/441 717/174 |
| 2003/0167354 | A1* | 9/2003 | Peppers | G06F 8/60 719/327 |
| 2005/0172280 | A1* | 8/2005 | Ziegler | G06F 21/56 717/168 |
| 2006/0075276 | A1* | 4/2006 | Kataria | G06F 8/65 714/47.1 |
| 2007/0067098 | A1* | 3/2007 | Zelentsov | G06F 17/30241 701/532 |
| 2008/0028385 | A1* | 1/2008 | Brown | G06F 8/65 717/170 |
| 2008/0133901 | A1* | 6/2008 | Nijhawan | G06F 9/4406 713/2 |
| 2008/0222076 | A1* | 9/2008 | Dandekar | G06Q 10/00 |
| 2010/0070619 | A1* | 3/2010 | Chaganti | G06F 8/67 709/222 |
| 2010/0138642 | A1* | 6/2010 | Cherian | G06F 9/4401 713/2 |
| 2011/0197051 | A1* | 8/2011 | Mullin | G06F 8/63 713/1 |
| 2011/0264772 | A1 | 10/2011 | Krapf et al. | |
| 2012/0311450 | A1* | 12/2012 | Gupta | G06F 8/63 715/735 |
| 2012/0311564 | A1* | 12/2012 | Khalid | G06F 8/61 718/1 |
| 2013/0055377 | A1* | 2/2013 | Chen | G06F 21/54 726/17 |
| 2013/0205278 | A1* | 8/2013 | Hirsch | G06F 8/20 717/121 |
| 2013/0247005 | A1* | 9/2013 | Hirsch | G06F 8/71 717/121 |
| 2013/0262846 | A1* | 10/2013 | Peterson | G06F 8/60 713/1 |
| 2013/0263105 | A1* | 10/2013 | Cornwell | G06F 8/665 717/168 |
| 2013/0268743 | A1* | 10/2013 | Waltermann | G06F 9/44 713/1 |

OTHER PUBLICATIONS

"System and Apparatus for Sharable Common Operating System in Cloud Computing", Authors et. al.: Disclosed Anonymously, IP.com No. IPCOM000208801D, IP.com Electronic Publication: Jul. 18, 2011.*
Windows Update—Microsoft—2015 Located at http://windows.microsoft.com/en-us/windows/windows-update.*
System and Apparatus for Sharable Common Operating System in Cloud Computing—Anonymous—2011 Published as ip.com No. IPCOM000208801D.*
Getting Most out of Information Systems—2015 Located at http://2012books.lardbucket.org/books/getting-the-most-out-of-information-systems-v1.3/s13-02-operating-systems.html.*
Anonymous—IPCOM208801—Jul. 18, 2011, located at IP.com.*

* cited by examiner

METHODS FOR CUSTOMIZING AN OPERATING SYSTEM AT AN INFORMATION HANDLING DEVICE

BACKGROUND

Generally, information handling devices (or embedded devices) such as mobile phones or tablet computers involve the use of firmware-based images. Conventionally, image files corresponding to an intended geographical region (for sale/distribution), or to another identifying aspect of a device, are installed at manufacture. Put another way, in order to support a preload image, manufacturers currently tend to include one image per country on an information handling device. It can thus become very costly and time consuming to create and maintain a large number of unique images, with considerable complexity being imparted to the process overall.

In contexts such as those described above, conventional arrangements can also involve the use of multiple partitions, wherein one partition is accorded for each possible customizing option. This, by extension, can occupy an inordinately a large amount of valuable space on a device.

Generally, it can further be noted that information handling devices have OS images that are monolithic in nature. A process of compiling and building produces an image that contains needed components; however, variations in devices (especially, in their identifying aspects as noted above) normally warrant more patches and updates to be provided that are unique in nature. In other words, to the extent that information handling devices may need to include images or other components that are uniquely tailored to one or more identifying aspects of the device, one or more patches or updates may be needed by way of altering or amending the OS or its functioning in order that such unique variations may adequately be supported. Conventional solutions, accordingly, tend to involve binary patches or partition/image fragmentation in order to permit discrete elements to be updated. This can prove to be an immensely complex and costly task, given the possibly wide range of variability at hand.

BRIEF SUMMARY

In summary, one aspect provides an information handling device comprising: a base operating system; one or more processors; one or more memories storing program instructions accessible by the one or more processors; and wherein, responsive to execution of program instructions accessible to the one or more processors, the one or more processors are configured to: communicate an aspect of the information handling device; and assimilate additional operating system content at the information handling device responsive to communication of the aspect of the device, the additional operating system content deriving from a repository separate from the information handling device; wherein the base operating system and additional operating system content combine to form a unitary device operating system.

Another aspect provides a method comprising: communicating an aspect of an information handling device; and assimilating additional operating system content at the information handling device responsive to communication of the aspect of the device, the additional operating system content deriving from a repository separate from the information handling device; wherein a base operating system and additional operating system content combine to form a unitary device operating system.

An additional aspect provides a program product comprising: a storage medium having program code embodied therewith, the program code comprising: program code configured to communicate an aspect of an information handling device; and program code configured to assimilate additional operating system content at the information handling device responsive to communication of the aspect of the device, the additional operating system content deriving from a repository separate from the information handling device; wherein a base operating system and additional operating system content combine to form a unitary device operating system.

Yet another aspect provides an information handling device comprising: a base operating system; one or more processors; one or more memories storing program instructions accessible by the one or more processors; and wherein, responsive to execution of program instructions accessible to the one or more processors, the one or more processors are configured to: communicate an aspect of the information handling device, the aspect comprising at least one taken from the group consisting of: a geographical aspect, a machine type model, a serial number, a user, a company; and assimilate additional operating system content at the information handling device responsive to communication of the aspect of the device; wherein the base operating system and additional operating system content combine to form a unitary device operating system.

The foregoing is a summary and thus may contain simplifications, generalizations, and omissions of detail; consequently, those skilled in the art will appreciate that the summary is illustrative only and is not intended to be in any way limiting.

For a better understanding of the embodiments, together with other and further features and advantages thereof, reference is made to the following description, taken in conjunction with the accompanying drawings. The scope of the invention will be pointed out in the appended claims.

DETAILED DESCRIPTION

It will be readily understood that the components of the embodiments, as generally described and illustrated in the figures herein, may be arranged and designed in a wide variety of different configurations in addition to the described example embodiments. Thus, the following more detailed description of the example embodiments, as represented in the figures, is not intended to limit the scope of the embodiments, as claimed, but is merely representative of example embodiments.

Reference throughout this specification to "one embodiment" or "an embodiment" (or the like) means that a particular feature, structure, or characteristic described in connection with the embodiment is included in at least one embodiment. Thus, appearances of the phrases "in one embodiment" or "in an embodiment" or the like in various places throughout this specification are not necessarily all referring to the same embodiment.

Furthermore, the described features, structures, or characteristics may be combined in any suitable manner in one or more embodiments. In the following description, numerous specific details are provided to give a thorough understanding of embodiments. One skilled in the relevant art will recognize, however, that the various embodiments can be practiced without one or more of the specific details, or with other methods, components, materials, etc. In other instances, well-known structures, materials, or operations are not shown or described in detail to avoid obfuscation. The following description is intended only by way of example, and simply illustrates certain example embodiments.

Figure 1:
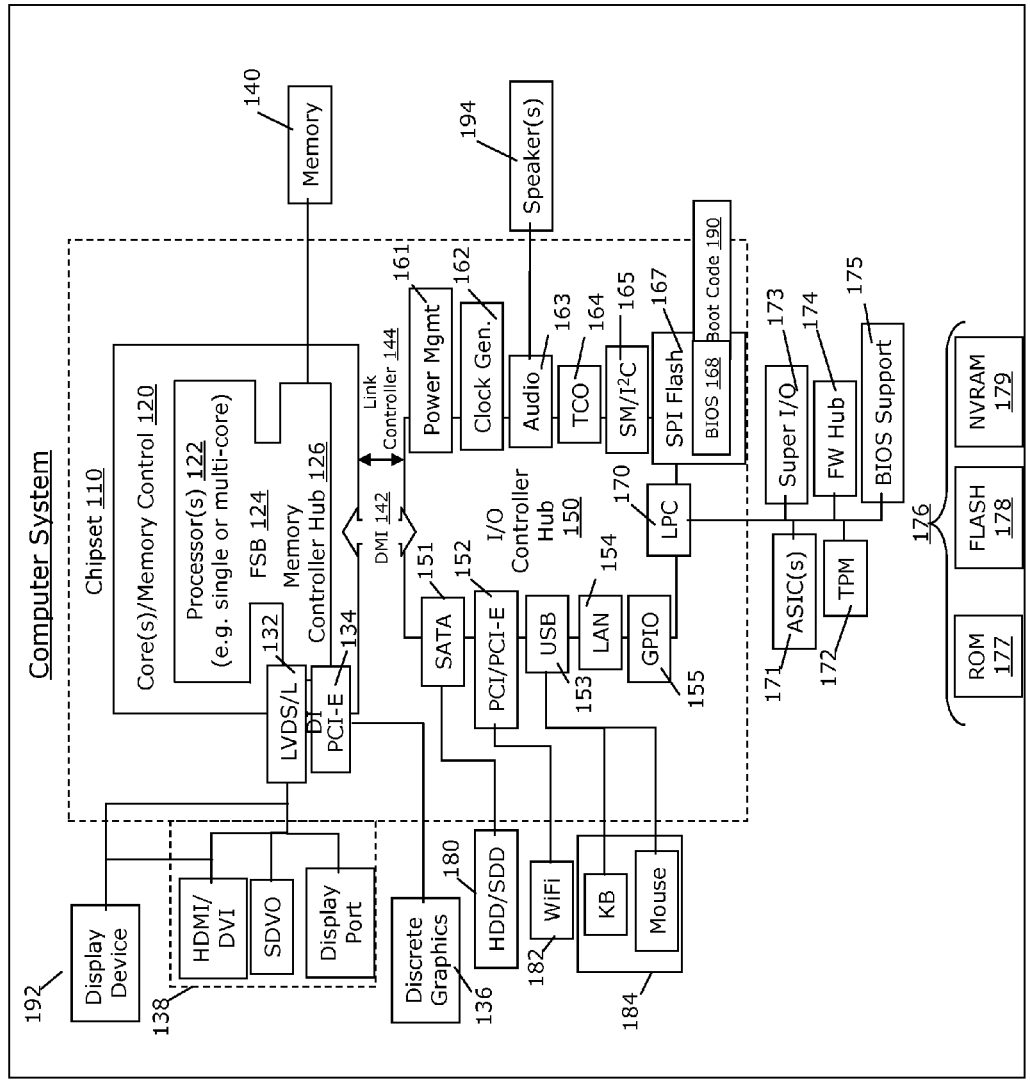
FIG. 1 illustrates an example circuitry of an information handling device system.

While various other circuits, circuitry or components may be utilized, FIG. 1 depicts a block diagram of one example of Win-Tel type information handling device circuits, circuitry or components. The example depicted in FIG. 1 may correspond to computing systems such as the THINKPAD series of personal computers sold by Lenovo (US) Inc. of Morrisville, NC, or other devices. As is apparent from the description herein, embodiments may include other features or only some of the features of the example illustrated in FIG. 1.

The example of FIG. 1 includes a so-called chipset 110 (a group of integrated circuits, or chips, that work together, chipsets) with an architecture that may vary depending on manufacturer (for example, INTEL, AMD, ARM, et cetera). The architecture of the chipset 110 includes a core and memory control group 120 and an I/O controller hub 150 that exchanges information (for example, data, signals, commands, et cetera) via a direct management interface (DMI) 142 or a link controller 144. In FIG. 1, the DMI 142 is a chip-to-chip interface (sometimes referred to as being a link between a "northbridge" and a "southbridge"). The core and memory control group 120 include one or more processors 122 (for example, single or multi-core) and a memory controller hub 126 that exchange information via a front side bus (FSB) 124; noting that components of the group 120 may be integrated in a chip that supplants the conventional "northbridge" style architecture.

In FIG. 1, the memory controller hub 126 interfaces with memory 140 (for example, to provide support for a type of RAM that may be referred to as "system memory" or "memory"). The memory controller hub 126 further includes a LVDS interface 132 for a display device 192 (for example, a CRT, a flat panel, a projector, et cetera). A block 138 includes some technologies that may be supported via the LVDS interface 132 (for example, serial digital video, HDMI/DVI, display port). The memory controller hub 126 also includes a PCI-express interface (PCI-E) 134 that may support discrete graphics 136.

In FIG. 1, the I/O hub controller 150 includes a SATA interface 151 (for example, for HDDs, SDDs, 180 et cetera), a PCIe interface 152 (for example, for wireless connections 182), a USB interface 153 (for example, for devices 184 such as a digitizer, keyboard, mice, cameras, phones, storage, other connected devices, et cetera), a network interface 154 (for example, LAN), a GPIO interface 155, a LPC interface 170 (for ASICs 171, a TPM 172, a super I/O 173, a firmware hub 174, BIOS support 175 as well as various types of memory 176 such as ROM 177, Flash 178, and NVRAM 179), a power management interface 161, a clock generator interface 162, an audio interface 163 (for example, for speakers 194), a TCO interface 164, a system management bus interface 165, and SPI Flash 167, which can include BIOS 168 and boot code 190. The I/O hub controller 150 may include gigabit Ethernet support.

The system, upon power on, may be configured to execute boot code 190 for the BIOS 168, as stored within the SPI Flash 167, and thereafter processes data under the control of one or more operating systems and application software (for example, stored in system memory 140). An operating system may be stored in any of a variety of locations and accessed, for example, according to instructions of the BIOS 168. As described herein, a device may include fewer or more features than shown in the system of FIG. 1.

Figure 2:
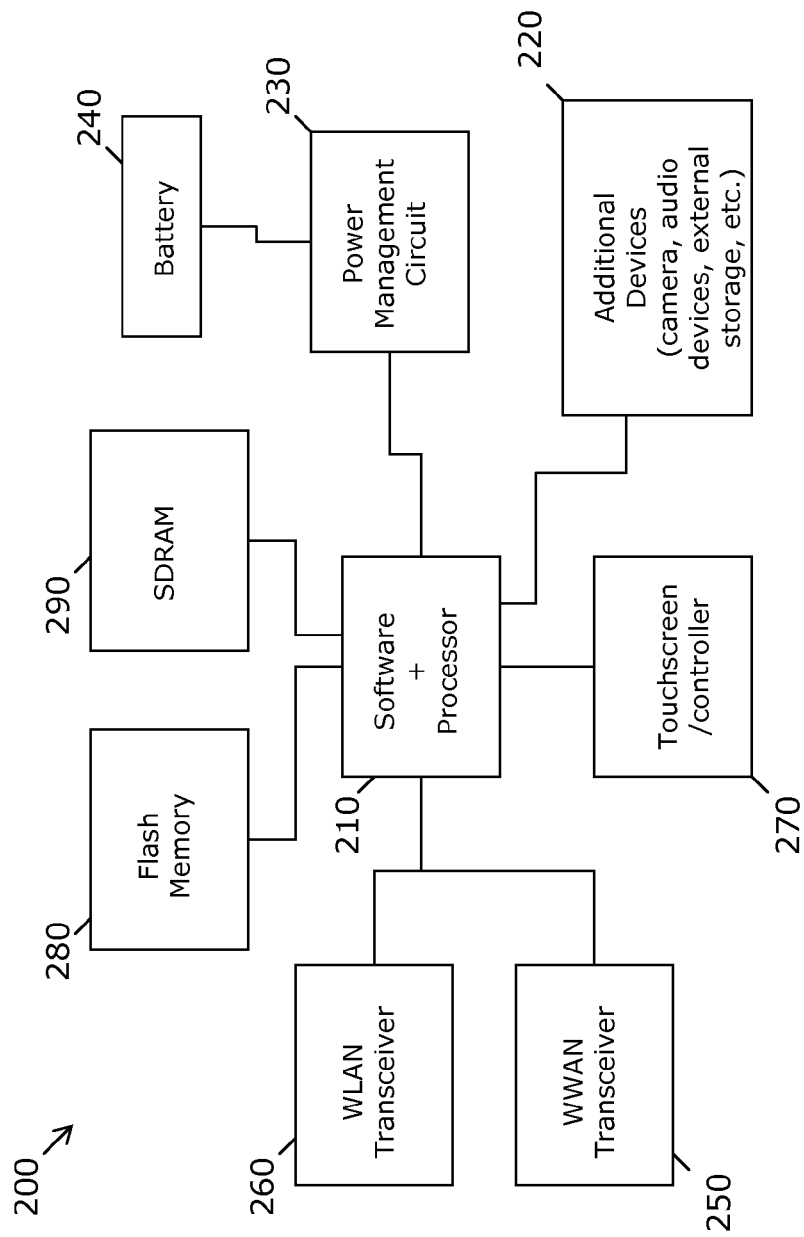
FIG. 2 illustrates another example circuitry of an information handling device system.

Referring to FIG. 2, with regard to smart phone and/or tablet circuitry 200, an example includes an ARM based system design, with software and processor(s) combined in a single chip 210. Internal busses and the like depend on different vendors, but essentially all the peripheral devices (220) may attach to a single chip 210. In contrast to the circuitry illustrated in FIG. 2, the tablet circuitry 200 may combine the processor, memory control, and I/O controller hub all into a single chip 210, commonly referred to a "system on a chip" (SOC). Also, ARM based systems 200 do not typically use SATA or PCI or LPC. Common interfaces for example include SDIO and I2C.

There are power management chip(s) 230, which manage power as supplied for example via a rechargeable battery 240, which may be recharged by a connection to a power source (not shown), and in at least one design, a single chip, such as 210, may be used to supply BIOS like functionality and DRAM memory.

ARM based systems 200 typically include one or more wireless transceivers, including, but not limited to, WWAN 260 and WLAN 250 transceivers for connecting to various networks, such as telecommunications networks and wireless base stations. Commonly, an ARM based system 200 will include a touchscreen 270 for data input and display. ARM based systems 200 also typically include various memory devices, for example flash memory 280 and SDRAM 290.

In addition to the types of devices described and illustrated herein with respect to FIGS. 1 and 2, embodiments can provide for a hybrid computing system comprising a primary environment (PE) (for example, a conventional computing device platform, such as a Win-Tel platform) and a secondary environment (SE) (for example, a mobile device platform, such as an ANDROID platform) in a single computing system.

Specific reference will now be made herebelow to FIGS. 3-8. To facilitate easier reference, in advancing from FIG. 3 to and through FIG. 8, a reference numeral is advanced by a multiple of 100 in indicating a substantially similar or analogous component or element with respect to at least one component or element found in at least one earlier figure among FIGS. 3-8.

It should be clearly understood that the various arrangements and processes broadly described and illustrated with respect to FIGS. 3-8, and/or one or more individual components or elements of such arrangements and/or one or more process steps associated of such processes, can be employed independently from or together with one or more other components, elements and/or process steps described and illustrated herein. Accordingly, while various arrangements and processes are broadly contemplated, described and illustrated herein, it should be understood that they are provided merely in illustrative and non-restrictive fashion, and furthermore can be regarded as but mere examples of possible working environments in which one or more arrangements or processes may function or operate.

In accordance with at least one embodiment, there are broadly contemplated herein methods and arrangements for providing, for an information handling device (e.g., a tablet computer or mobile telephone), a limited number of images with common content at a manufacturing stage, whereupon image-unique content can be downloaded and installed at a first boot of the device. Accordingly, a number of images provided at a manufacturing stage can thereby be greatly reduced by breaking up, dividing or delineating device content into common base content and image-unique content. The base content is thereby installed during manufacturing and the first boot content is gathered and installed during a first boot process.

In accordance with at least one embodiment, by way of an illustrative and non-restrictive example, base content can generally be common across multiple regions and languages while image-unique (first-boot) content can be region- and/or language-specific. (In this vein, region-specific content could be specific to a country or group of countries.)

In accordance with at least one embodiment, in the context of information handling devices such as mobile phones or tablet computers, a small subset of image content that is common to different geographical regions (or other identifying aspects of a device) are preloaded at manufacture, while region-specific (or aspect-specific) content is downloaded and installed at another time, such as at first boot. This can considerably streamline the process in that easily 70 to 75 percent of image content of a given device can be common with that of other devices (that otherwise may differ in terms of their intended geographical regions or other identifying aspects). For instance, common content can include a base OS as well as language-specific content that may be usable across different regions or countries sharing a common language. On the other hand, region-specific or aspect-specific content can include applications ("apps") that may be allowed in one country or not another, or may take on a different appearance or functionality in one country as compared to others. Default web browsers, for instance, can emerge as region-specific content.

Figure 3:
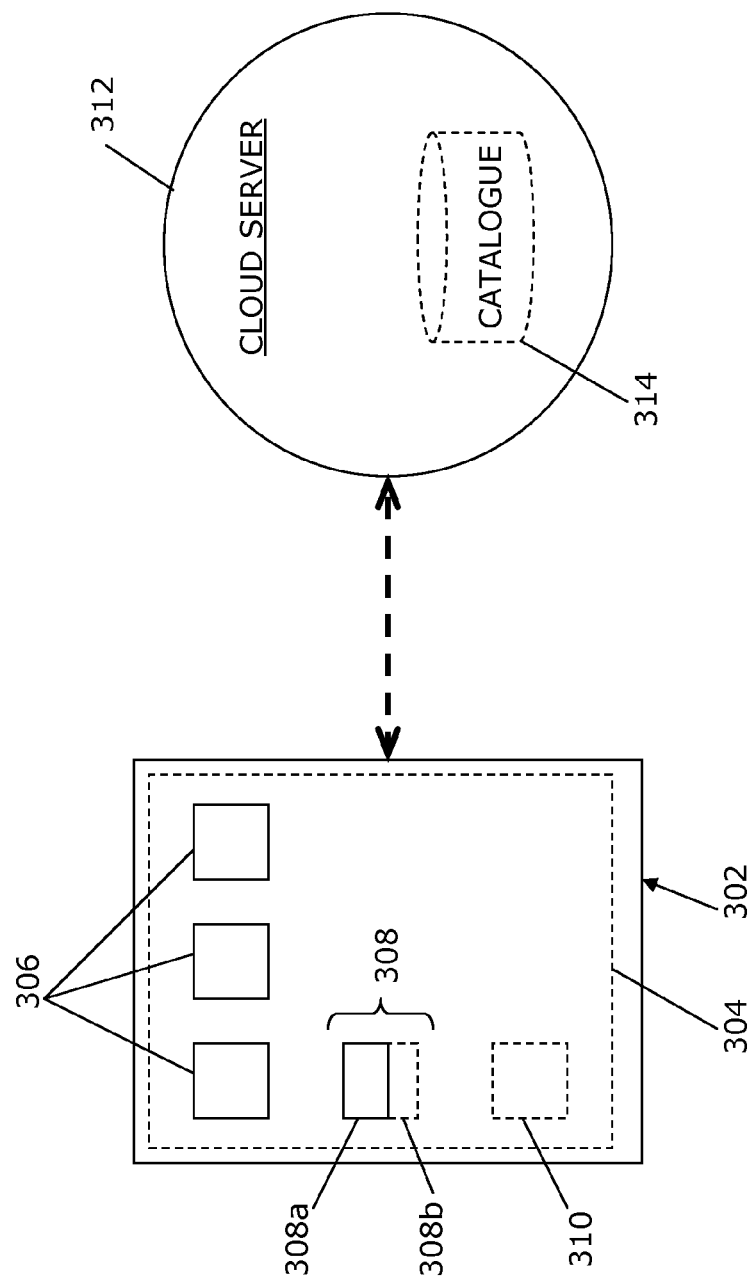
FIG. 3 schematically illustrates an image installing arrangement.

FIG. 3 schematically illustrates an image installing arrangement, in accordance with at least one embodiment. As shown, an information handling device 302 includes an image 304 configurable for the device 302 in question. As such, and by way of an illustrative and non-restrictive example, image 304 can include individual apps or other items of content 306 that are common to device 302 and at least one other information handling device (e.g., mobile phones or tablet computers that are to be sold/distributed in a variety of countries or regions). On the other hand, indicated at 308 is a content item that has two components, namely, a component of common content 308a and a component of unique content 308b. Finally, indicated at 310 is a content item that represents content unique to device 302 alone or to device 302 and other devices of common aspect (e.g., devices intended for sale/distribution in a common geographical area).

In accordance with at least one embodiment, device 302 leaves the factory with a pre-loaded image containing content items 306, and partial item 308a, already installed. Upon first boot, or at another predetermined or user-selected time, device 302 communicates with a cloud server 312, which itself includes a catalogue or other database 314 of items of unique content that can be downloaded by devices.

Downloading then takes place, whereby a unique content item 310 and partial content item 308b can be installed. By way of an illustrative and non-restrictive example, cloud server 312 could represent or be associated with an "app store" connected with the manufacturer of device 302, and the call to initiate downloading unique content items (or partial content items) can be an API (application programming interface) call that is automatically triggered upon first boot or otherwise user-initiated.

Figure 4:
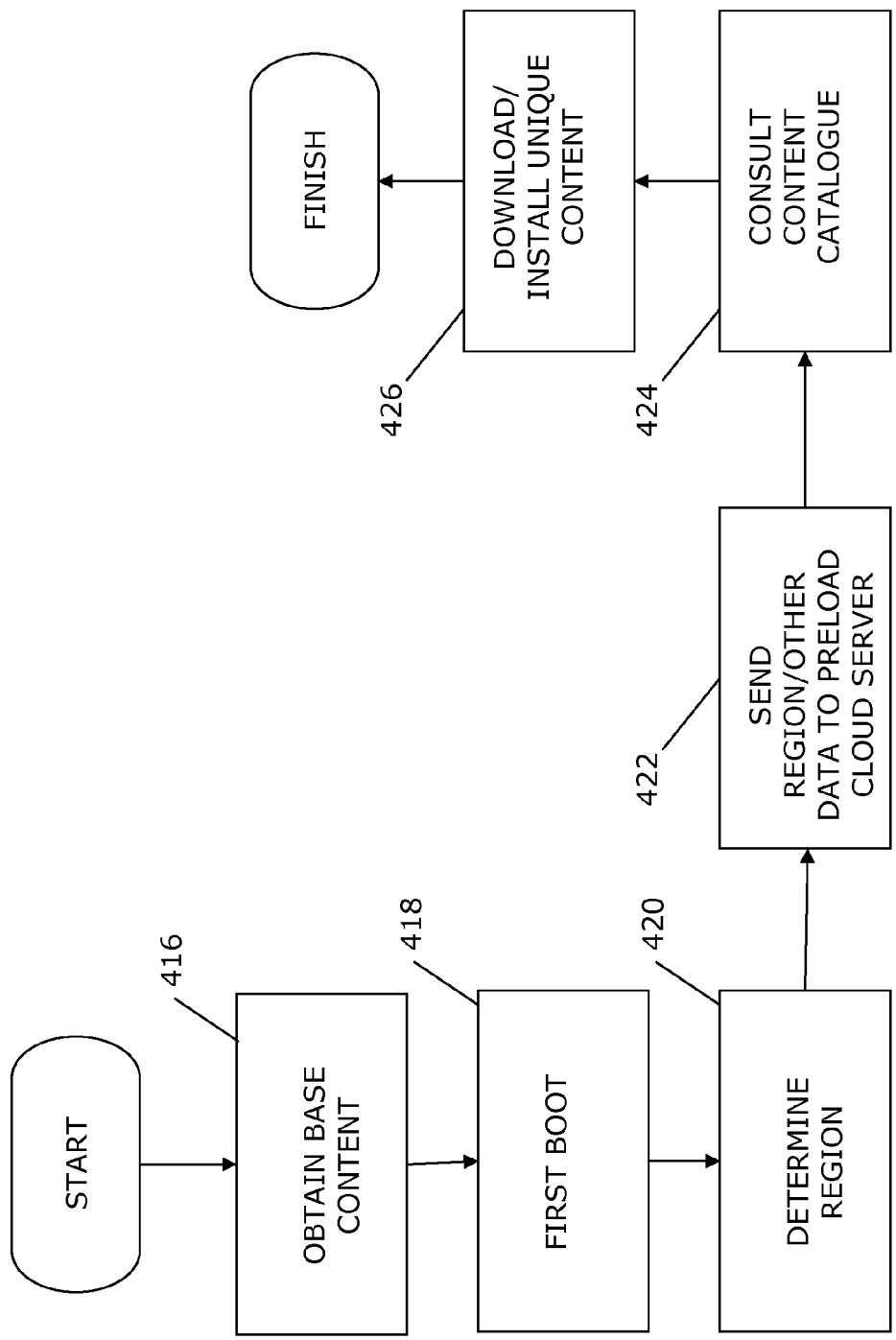
FIG. 4 schematically illustrates an image installing process.

FIG. 4 schematically illustrates an image installing process, in accordance with at least one embodiment. At manufacture, base or common content is obtained by a device (416). During or upon first boot of the device (418), either the device will automatically detect a region where the device is located, or the user will specify the region (e.g., from a drop-down menu) (420). In the former case, the device can determine its location (and thus the region in which it is located) via GPS, network IP or cell tower location/orientation. In either event, the device can then transmit the region along with other device data, the MTM (machine type model; i.e., the type and/or version of the device), user ID, etc., to a preload cloud server (422). As touched on further above, the cloud server then consults a catalogue of content (424) that is intended for each MTM/region combination, and the unique content is downloaded and installed at the device (426). It can be appreciated that, since the unique content is stored at or via a cloud server, the content is easily updatable and does not require a change to a device or manufacturing line when updating of the content needs to take place.

In accordance with a specific working example, in accordance with at least one embodiment, a cloud server is embodied by an "app store" or "app shop". Based on data sent to the cloud server, the "app store" decides on additional preload modules that would be intended for a specific MTM/region combination. For example, a tablet computer can be shipped out with a basic OS installed, but during first boot the device will detect, or the user will select, a location where the tablet is first being booted (e.g., a specific country such as Japan). It can also be appreciated that, in the alternative, a user can select a geographic location other than that where the tablet is being booted; e.g., he/she may purchase the tablet and boot it in the U.S. but select another country (e.g., Japan) as a country of destination or residence, for which relevant unique content is to be sought.

In accordance with at least one embodiment, content does not need to be tied to a specific user of the device in question. However, the user could be asked to register to an "app store" at first boot, whereupon bonus or customer-specific content could be downloaded as further "unique content".

Figure 5:
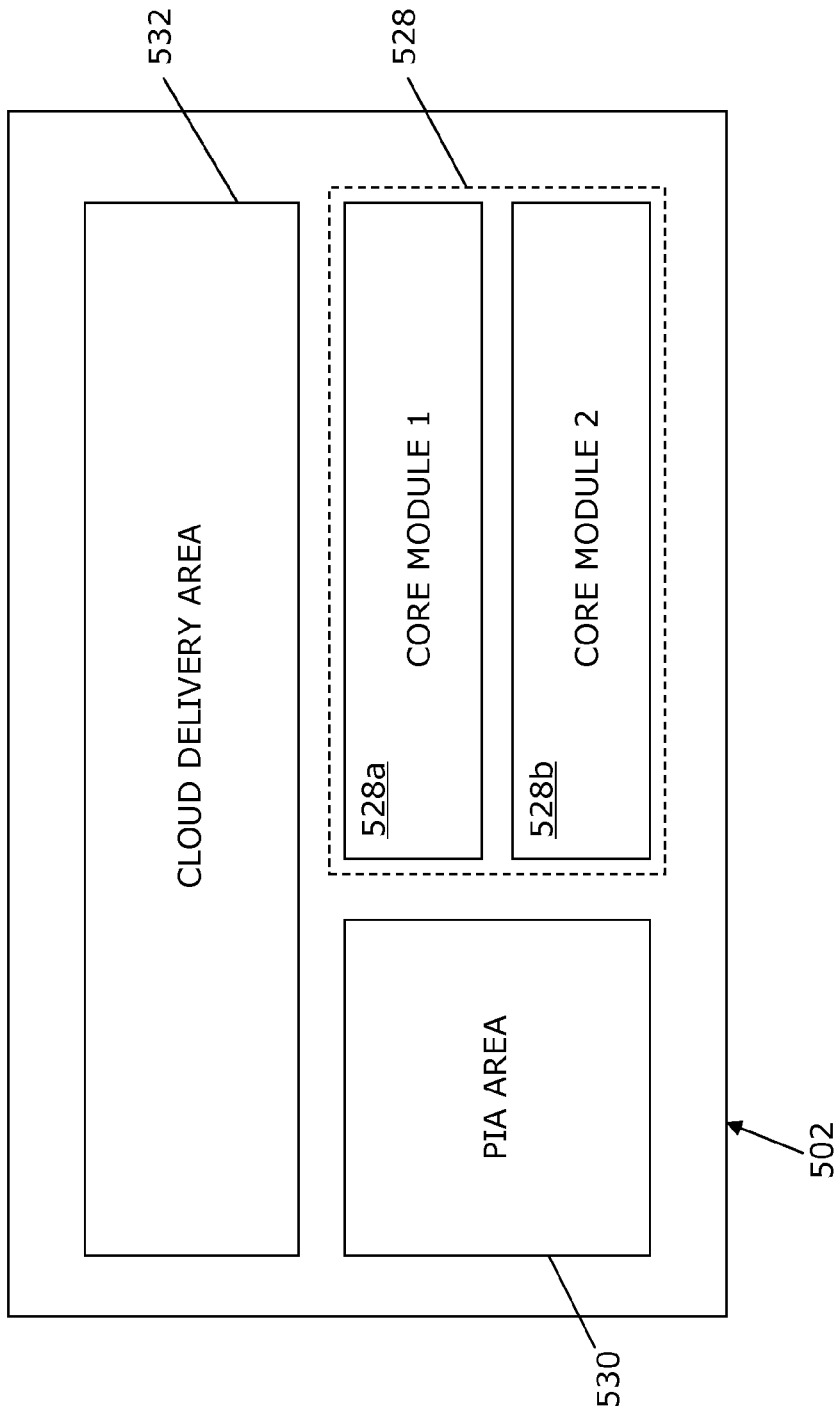
FIG. 5 schematically illustrates a device with operating system and application modules.

In accordance with at least one embodiment, it can be appreciated that there is broadly contemplated herein a combination of device manufacturing with cloud delivery in order to produce a complete image once a customer is in possession of a device. Some discrete components are thereby contemplated in place of a single, monolithic image and associated OS. As such, and as schematically shown in FIG. 5, a "common" area (or OS core) 528 of an information handling device 502 may contain a kernel, DRM (digital rights management system) and any and all other components that would be common to different devices (e.g., boot code, a partition layout and/or proprietary items such as encryption and enterprise management). Interchangeable first and second core modules 528a and 528b, respectively, can represent different versions of a core wherein one includes DRM code and one does not. It is possible to install one core module 528a/528b or the other, and not both, depending on which version of a core is desired for the device 502 in question. However, it is also conceivable to have both 528a/528b installed, wherein the one needed or desired for device 502 can then be activated.

On the other hand, in accordance with at least one embodiment, additional modules can be constituted by a preload install area (PIA) 530 and a cloud-based delivery area 532. Each of the three areas 528/530/532 can contribute components to produce what the customer might expect to get with a device when he/she purchase it, based on an intended geographical region and/or other identifying aspect of the device.

In accordance with at least one embodiment, the common area (or OS core) 528 covers many images that would be common to different information handling devices. Components of PIA area 530, on the other hand, can be unique to a customer, or for a region. Further, cloud content, delivered to the cloud delivery area 532, can be delivered at first boot, is not tied to the manufacturing process, and provides flexibility by allowing the cloud content to be defined in the servers, such that the user can get predefined packages at first boot. Such packages may be based on an intended geographical region and/or another identifying aspect of the device.

In accordance with at least one embodiment, it can be appreciated that a modular device is accorded, that flexibly can be tailored or customized to devices associated with an intended geographical region and/or one or more other identifying aspects of devices. At the point of manufacture, the PIA area 530 and OS core 502 are present. However, the PIA area 530 is configured to accommodate additional patches for configuring the device for an intended geographical region and/or one or more other identifying aspect. Such patches can already be present in the device 502 at manufacture (e.g., in a repository within the device, which may, e.g., be within or constituted by the PIA area 530), to then be activated at a predetermined time (e.g., at first boot), or could be downloadable (e.g., from a cloud server) at a predetermined time (e.g., at first boot). (Device 502 can even accommodate both scenarios if desired, i.e., activate one or more patches already present in the device and download one or more from elsewhere [e.g., a cloud server], each at the same or different predetermined times.) Though OS patches can take on a very wide variety of forms, by way of illustrative and non-restrictive example they can include a patch to tether a given app to the device and/or to disable such an app (in the OS core).

In accordance with at least one embodiment, to the extent that OS patches are discussed herein, it can be appreciated that downloadable items such as those found in an "app store" present a different task in that such items are end user items and can be installed, removed, modified. In other words, OS patches and related items are beyond the sight or control of an end user, while downloadable items such as apps are not, and embodiments herein variously address both types of components to the extent that an information handling device can be customized or tailored for a particular intended geographical region and/or other identifying aspect of the device.

Figure 6:
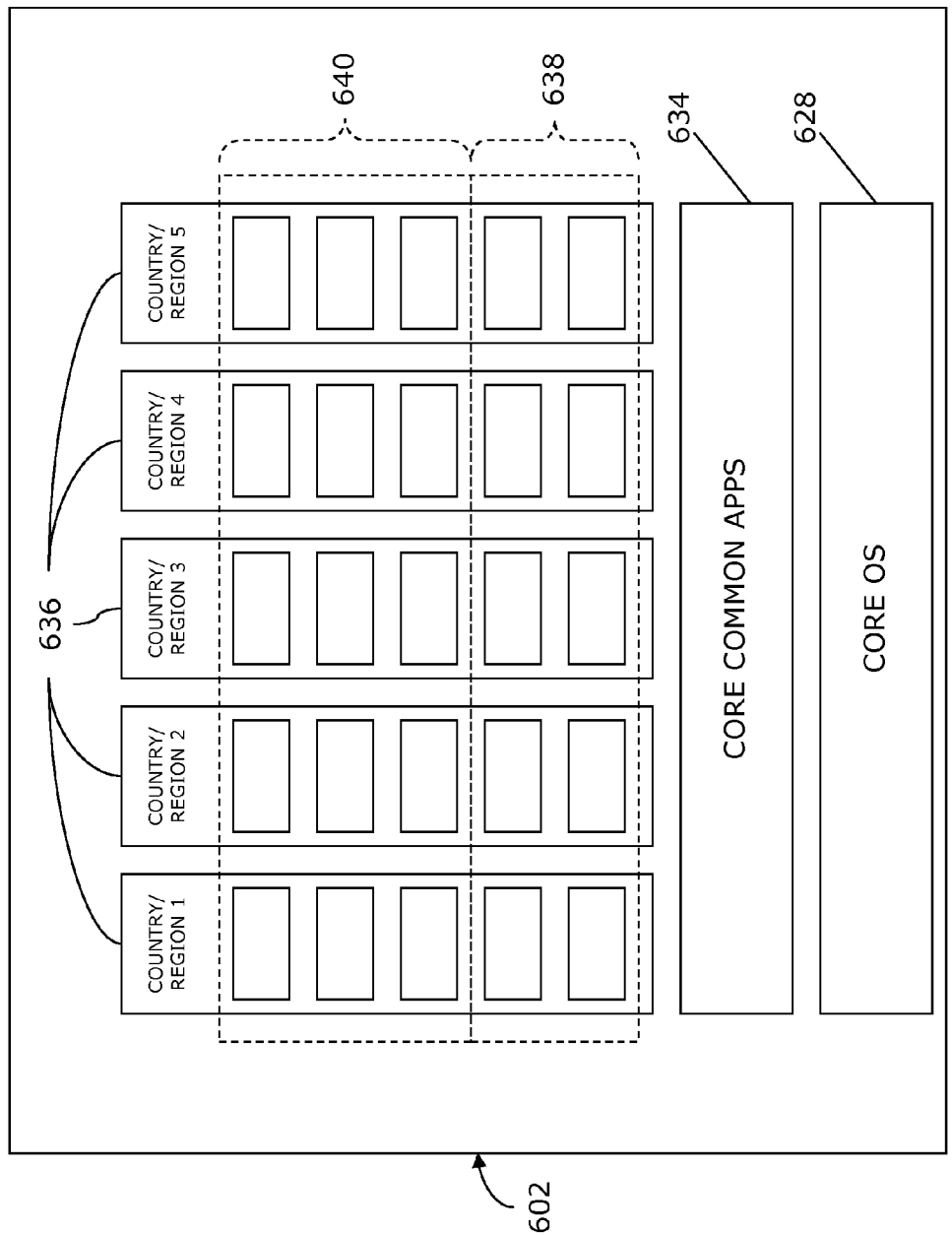
FIG. 6 schematically illustrates a device with application package modules.

FIG. 6 schematically illustrates an embodiment in which apps and predefined packages are involved. As shown, a core OS 628 and core common apps 634 can be loaded at manufacture. On the other hand, a number (five are shown here) of country- or region-specific packages 636 can be downloaded from an app shop or cloud server. The packages 636 can each include, among other things, "mandatory" apps 638 that would be shared by at least some devices, and others 640 that would be unique to some devices (e.g., based on intended geographical region) and not shared by some others. (In accordance with the present illustrative example, "mandatory" apps 638 can be common to some devices, e.g., within a very broadly defined geographic region, or could even be common to all devices. These can be distinguished from core common apps 634 based on given criteria, or in some cases need not necessarily be distinguishable from core common apps 634 but for the manner in which they are provided to device 602. By way of a non-restrictive example, mandatory apps 638 can be considered at a given point in time to be required for a large number of devices, with a recognition that their necessity may not be of a permanent nature and that they could easily be replaced or reconfigured with other apps at some point in the future. While this can also hold true for core common apps 634, it is conceivable to include apps among core common apps 634 that are considered to be more permanent in nature, or less likely to be replaced or reconfigured at a future timepoint. In this manner, a hierarchy of common apps can be afforded, wherein those thought to be more permanent can be included in core common apps 634 while those thought to be less permanent and more changeable can be included in mandatory apps 638.)

In accordance with at least one embodiment of the invention, to the extent that geographical regions are discussed herein as representing a parameter for identifying a device and determining content to be supplied to the device, one or more other identifying aspects of a device, instead or in addition, could be employed to assist in making such a determination. Thus, for instance, instead of identifying a geographical region of or for a device, the device could be identified by a device identifier not associated with a geographical region. For example, such a device identifier could be an MTM (machine type model, or model number), wherein devices presenting a given model number would trigger the downloading or supplying of additional (and/or unique) image or operating system content to a device. Other device identifiers can include, by way of example, a serial number, a user or a company associated with the device.

In accordance with at least one embodiment, to the extent that OS patches may have been included in or downloaded to a device, thus altering the basic makeup and functioning of the OS itself, broadly contemplated herein are arrangements for recovering any missing or altered components of an original OS at least to such a degree as to adequately accommodate updates to the OS or other area of the device. As can be appreciated from the foregoing, a system image can be split generally into two portions, wherein one portion is common to a majority or large number of information handling devices in a given distribution, with the other portion representing an overlay of distribution-specific files. At first boot, a program can be run just after the file systems are mounted to create a series of links to region-specific files in another partition (e.g., a PIA area such as that indicated at 504 in FIG. 5). This program can check for the existence of a recovery list to quickly exit so as to not slow the device down during subsequent boots, wherein such a recovery list would contain files or portions thereof that would need to be recovered at a subsequent time in connection with accommodating an OS update or OTA patch (see below). The program can also process a list of files to delete from the system image and then creates links from a parallel system image and the common system image. Files are not then removed but are renamed to a backup name, to prevent actual installation or usage of these files.

In accordance with at least one embodiment, all files that are modified are indeed written to a list of files, or recovery list that would need to be corrected when an update such as an OTA (over-the-air) patch is applied. (An "OTA patch" can be recognized herein as a specific type of update that can be accommodated by a device; it is provided here as but an illustrative and non-restrictive example of an update.) On boot of the device into recovery mode to apply an OTA patch or other update, the recovery list is read in and the links are removed. Also, any backup files are restored so that when the OTA patch (or other update) is applied the system partition appears similarly to the base partition. Thence, again at reboot, the process of recreating the links occurs to re-customize the device for distribution. It can thus be appreciated that, throughout the process, certain files and actions relating thereto are hidden to the end-user, and only are exploited to the extent that would be needed to accommodate an OTA patch (or other update).

Figure 7:
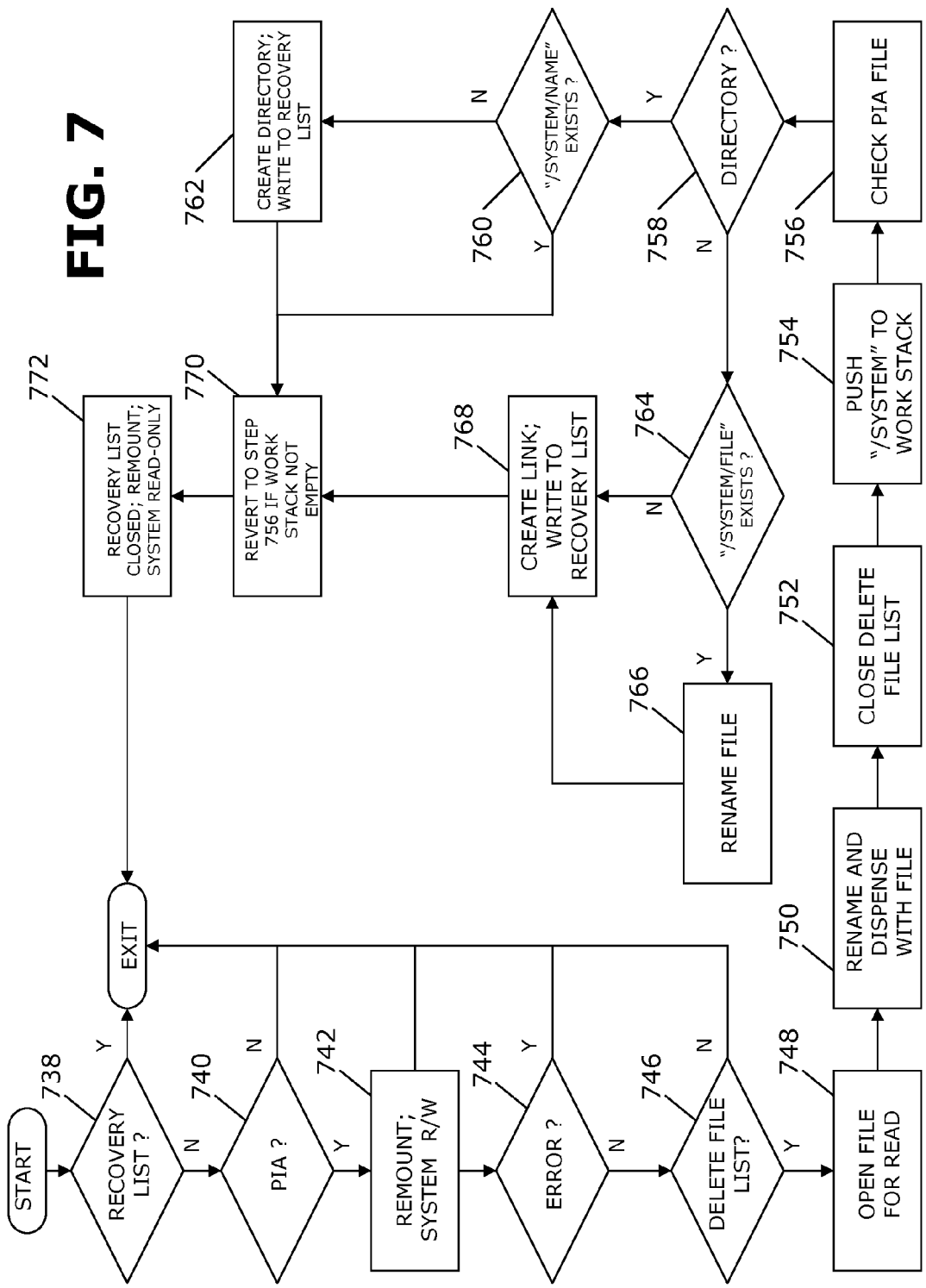
FIG. 7 schematically illustrates a process for system image boot to prepare for accommodating at least one update.

Accordingly, FIG. 7 schematically illustrates a process for system image boot to prepare for accommodating at least one update, such as an update (e.g., OTA patch) to an OS, in accordance with at least one embodiment. First, a check is made for a recovery list (738). If the list does exist, then the process exits. Otherwise, a check (740) is made for a PIA in the device (e.g., as indicated at 530 in FIG. 5) and, if one is not found, the process exits, while the process continues if indeed a PIA is present.

As such, in accordance with at least one embodiment, the system remounts (i.e., there is a disconnect from the file system, followed by reconnect to the file system) and system read-write is permitted temporarily (742). If a log file cannot be written into, then the process finishes with an error (744). Otherwise, a check is made as to whether a delete file list is present (746), for example (but not necessarily), in the PIA. (The delete file list, for its part, may be sight-unseen to the user in embodiments, or alternatively could be visible to the user.) If such a file exists, then it is opened for read (748) and, for each file listed, if the named file exists, then that file is renamed (e.g., to "name_orig") and the file is then dispensed with (e.g., archived, backed up, or deleted, and/or [for instance] written to the recovery list file) (750). The delete file list is then closed (752). In accordance with at least one embodiment, "/system" is pushed onto the work stack (754) and, for as long as the work stack is not empty, a "top entry" is opened and the status of a PIA file is checked (756) to see if it is a directory or file (758). (It should be noted that "/system" can be a location where the OS and device-specific apps. [e.g., that were added during manufacturing] can be stored, and which location is typically read-only to the end user. On the other hand, "/data" can be a location where end-user content is stored and typically could be writable to by the end-user.) If a directory, then a check is made to see if "/system/name" exists (760); if not, a directory is created and the name is written to the recovery list file (762). If not a directory, then if (764) there exists a file "/system/file", this file is renamed to "/system/file_orig" (766). A symbolic link is then created between "pia/system/file" and "/system/file", and the name (the file in the PIA that was linked to, or the file that was renamed in step 766) is written to the recovery list (768). (It should be noted that the written name, as just mentioned, need only represent some sort of unique identifier that will permit the recovery list to find the change). If the work stack is not empty, then (770) a reversion is made to step 756; otherwise, the recovery list file is then closed, and then the system remounts and reverts to read-only (772).

Figure 8:
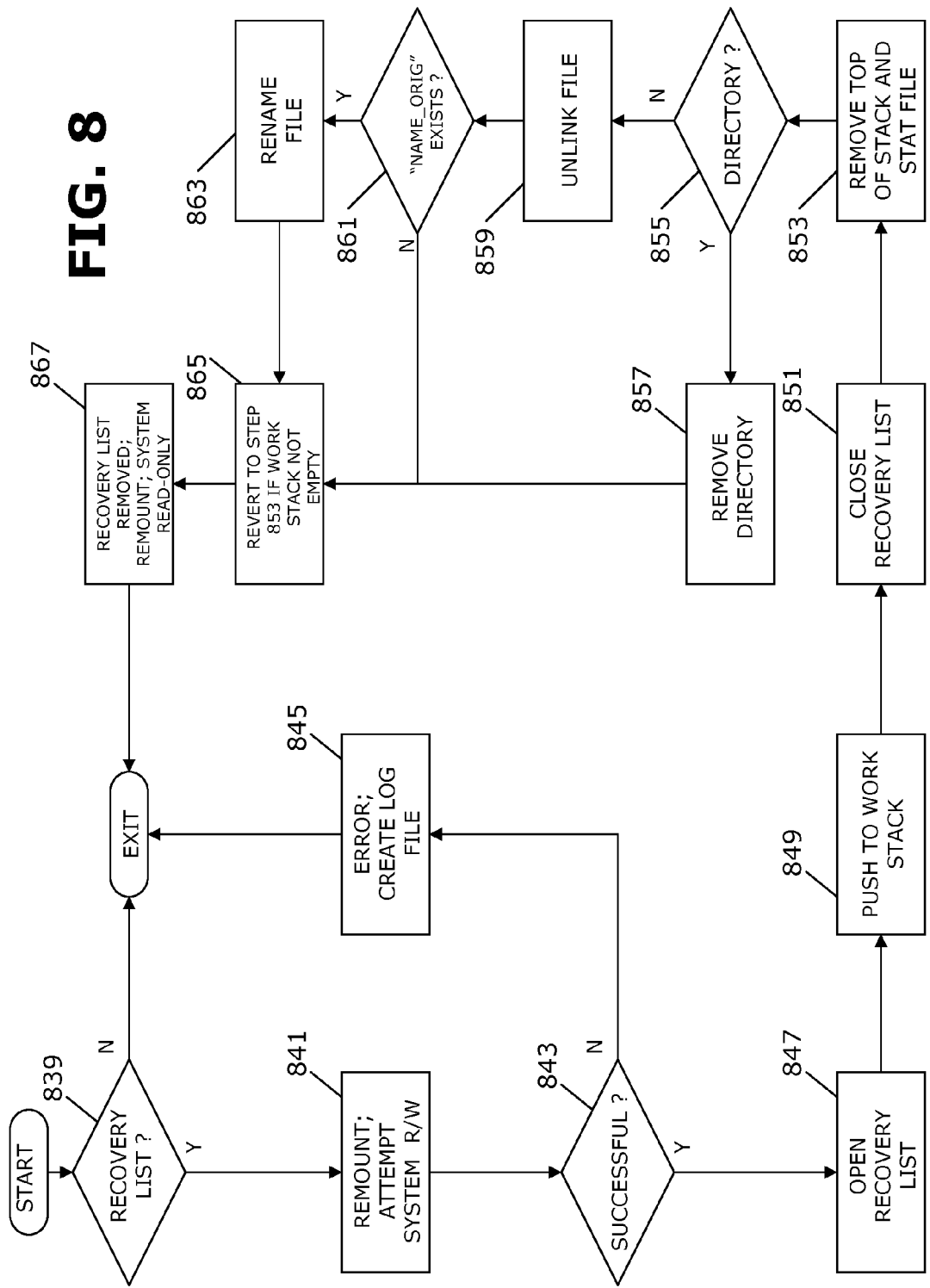
FIG. 8 schematically illustrates an operating system file recovery process.

In accordance with at least one embodiment of the invention, and as schematically illustrated in FIG. 8, during recovery the following process is undertaken. The existence of a recovery list file is checked for (839). If it does not exist, then the process exits. Otherwise, the system remounts and an attempt at read-write is made (841), but if (843) the attempt is not successful then a log file is created in cache (845) and the process exits with an error. As the process continues, the recovery list file is opened (847) and each line in the file is pushed onto a work stack (849). The recovery list is then closed (851).

In accordance with at least one embodiment of the invention, for as long as the work stack is not empty, the top of the stack and stat file are removed. If (855) the removed file is a directory, the directory is removed (857); else, the file is unlinked (859). Continuing, if the file is not a directory, then (by way of an illustrative and non-restrictive example) a check is made as to whether (861) a file with the name, "name_orig" exists; if so, then it is renamed to "name" (863). In all eventualities here, if the work stack is not empty, a reversion (865) is made back to step 853; otherwise, the recovery list is removed, the system remounts, and read-only is reverted to (867).

In accordance with at least one embodiment of the invention, to the extent that information handling devices are discussed herein, it should be understood that they can represent a very wide range of devices, applicable to a very wide range of settings. Thus, by way of illustrative and non-restrictive examples, such devices and/or settings can include mobile telephones, tablet computers, other portable computers such as portable laptop computers, and appliances, such as televisions, which may contain or incorporate an information handling device and/or aspects thereof As will be appreciated by one skilled in the art, various aspects may be embodied as a system, method or computer (device) program product. Accordingly, aspects may take the form of an entirely hardware embodiment or an embodiment including software that may all generally be referred to herein as a "circuit," "module" or "system." Furthermore, aspects may take the form of a computer (device) program product embodied in one or more computer (device) readable medium(s) having computer (device) readable program code embodied thereon.

Any combination of one or more non-signal computer (device) readable medium(s) may be utilized. The non-signal medium may be a storage medium. A storage medium may be, for example, an electronic, magnetic, optical, electromagnetic, infrared, or semiconductor system, apparatus, or device, or any suitable combination of the foregoing. More specific examples of a storage medium would include the following: a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

Program code embodied on a storage medium may be transmitted using any appropriate medium, including but not limited to wireless, wireline, optical fiber cable, RF, et cetera, or any suitable combination of the foregoing.

Program code for carrying out operations may be written in any combination of one or more programming languages.

The program code may execute entirely on a single device, partly on a single device, as a stand-alone software package, partly on single device and partly on another device, or entirely on the other device. In some cases, the devices may be connected through any type of network, including a local area network (LAN) or a wide area network (WAN), or the connection may be made through other devices (for example, through the Internet using an Internet Service Provider) or through a hard wire connection, such as over a USB connection.

Aspects are described herein with reference to the figures, which illustrate example methods, devices and program products according to various example embodiments. It will be understood that the actions and functionality illustrated may be implemented at least in part by program instructions. These program instructions may be provided to a processor of a general purpose computer, special purpose computer, or other programmable data processing device or information handling device to produce a machine, such that the instructions, which execute via a processor of the device implement the functions/acts specified.

The program instructions may also be stored in a device readable medium that can direct a device to function in a particular manner, such that the instructions stored in the device readable medium produce an article of manufacture including instructions which implement the function/act specified.

The program instructions may also be loaded onto a device to cause a series of operational steps to be performed on the device to produce a device implemented process such that the instructions which execute on the device provide processes for implementing the functions/acts specified.

This disclosure has been presented for purposes of illustration and description but is not intended to be exhaustive or limiting. Many modifications and variations will be apparent to those of ordinary skill in the art. The example embodiments were chosen and described in order to explain principles and practical application, and to enable others of ordinary skill in the art to understand the disclosure for various embodiments with various modifications as are suited to the particular use contemplated.

Thus, although illustrative example embodiments have been described herein with reference to the accompanying figures, it is to be understood that this description is not limiting and that various other changes and modifications may be affected therein by one skilled in the art without departing from the scope or spirit of the disclosure.

What is claimed is:

1. An information handling device comprising:
a base operating system supplied at time of manufacture, wherein the base operating system content comprises content that is common to at least one other information handling device and wherein the content is common across a plurality of regions and languages;
a preload install area comprising at least one additional system content;
one or more processors;
one or more memories storing program instructions accessible by the one or more processors; and
wherein, responsive to execution of program instructions accessible to the one or more processors, the one or more processors:
activate, during a boot of the information handling device, the at least one additional system content from the preload install area with the base operating system;
communicate, during a boot of the information handling device, an aspect of the information handling device to a repository separate from the information handling device for selecting at least one additional operating system content to be added to the base operating system to form a unitary device operating system; and
retrieve the additional operating system content and add the additional operating system content to the preload install area;
wherein the base operating system and the additional operating system content are combined to form the unitary device operating system;
wherein at least one of the additional operating system content of the unitary device operating system comprises an operating system patch that alters the functioning of the base operating system and causes creation of a recovery list containing files that are modified for recovering missing or altered components of the original operating system upon application of a subsequent over-the-air patch;
wherein, responsive to receiving the subsequent over-the-air patch, installing the over-the-air patch on the unitary operating system by:
booting the unitary operating system into recovery mode, reading the recovery list, and correcting the modified files by applying the over-the-air patch; and
rebooting the unitary device operating system including the applied over-the-air patch.

2. The information handling device according to claim 1, wherein the communicated aspect of the information handling device comprises a geographical aspect.

3. The information handling device according to claim 1, wherein the one or more processors detect the aspect of the information handling device automatically.

4. The information handling device according to claim 3, wherein:
the communicated aspect of the information handling device comprises a geographical aspect; and
the geographical aspect is detected automatically.

5. The information handling device according to claim 1, wherein the aspect of the information handling device is communicated responsive to a user prompt.

6. The information handling device according to claim 1, wherein the repository comprises a cloud-based repository.

7. The information handling device according to claim 1, wherein the additional operating system content comprises at least one operating system patch.

8. A method comprising:
starting a base operating system supplied at time of manufacture, wherein the base operating system content comprises content that is common to at least one other information handling device and wherein the content is common across a plurality of regions and languages;
accessing a preload install area supplied at time of manufacture, wherein the preload install area comprises at least one additional system content;
activating, during a boot of the information handling device, the at least one additional system content from the preload install area with the base operating system;
communicating, during a boot of an information handling device, an aspect of the information handling device to a repository separate from the information handling device for selecting at least one additional operating system content to be added to the base operating system to form a unitary device operating system; and
retrieving the additional operating system content and adding the additional operating system content to the preload install area;

wherein a base operating system and the additional operating system content are combined to form the unitary device operating system;

wherein at least one of the additional operating system content of the unitary device operating system comprises an operating system patch that alters the functioning of the base operating system and causes creation of a recovery list containing files that are modified for recovering missing or altered components of the original operating system upon application of a subsequent over-the-air patch;

wherein, responsive to receiving the subsequent over-the-air patch, installing the over-the-air patch on the unitary operating system by:

booting the unitary operating system into recovery mode, reading the recovery list, and correcting the modified files by applying the over-the-air patch; and rebooting the unitary device operating system including the applied over-the-air patch.

9. The method according to claim 8, wherein said communicating comprises communicating a geographical aspect.

10. The method according to claim 8, further comprising detecting the aspect of the information handling device automatically.

11. The method according to claim 10, wherein:

said communicating comprises communicating a geographical aspect; and said detecting comprises detecting the geographical aspect automatically.

12. The method according to claim 8, wherein the repository comprises a cloud-based repository.

13. The method according to claim 8, wherein the additional operating system content comprises at least one operating system patch.

14. A program product comprising:

a non-signal storage medium having program code embodied therewith, the program code comprising:

program code that starts a base operating system supplied at time of manufacture, wherein the base operating system content comprises content that is common to at least one other information handling device and wherein the content is common across a plurality of regions and languages;

program code that accesses a preload install area supplied at time of manufacture, wherein the preload install area comprises at least one additional system content;

program code that activates, during a boot of the information handling device, the at least one additional system content from the preload install area with the base operating system;

program code that communicates, during a boot of an information handling device, an aspect of the information handling device to a repository separate from the information handling device for selecting at least one additional operating system content to be added to the base operating system to form a unitary device operating system;

program code that retrieves the additional operating system content and adds the additional operating system content to the preload install area; and wherein the base operating system and the additional operating system content combined to form the unitary device operating system;

wherein at least one of the additional operating system content of the unitary device operating system comprises an operating system patch that alters the functioning of the base operating system and causes creation of a recovery list containing files that are modified for recovering missing or altered components of the original operating system upon application of a subsequent over-the-air patch;

wherein, responsive to receiving the subsequent over-the-air patch, installing the over-the-air patch on the unitary operating system by:

booting the unitary operating system into recovery mode, reading the recovery list, and correcting the modified files by applying the over-the-air patch; and rebooting the unitary device operating system including the applied over-the-air patch.

15. An information handling device comprising:

a base operating system supplied at time of manufacture, wherein the base operating system content comprises content that is common to at least one other information handling device and wherein the content is common across a plurality of regions and languages;

a preload install area comprising at least one additional system content;

one or more processors;

one or more memories storing program instructions accessible by the one or more processors; and wherein, responsive to execution of program instructions accessible to the one or more processors, the one or more processors:

activate, during a boot of the information handling device, the at least one additional system content from the preload install area with the base operating system;

communicate, during a boot of the information handling device, an aspect of the information handling device for selecting at least one additional operating system content to be added to the base operating system to form a unitary device operating system, the aspect comprising at least one taken from the group consisting of: a geographical aspect, a machine type model, a serial number, a user, and a company;

retrieve the additional operating system content and add the additional operating system content to the preload install area; and wherein the base operating system and the additional operating system content are combined to form the unitary device operating system;

wherein at least one of the additional operating system content of the unitary device operating system comprises an operating system patch that alters the functioning of the base operating system and causes creation of a recovery list containing files that are modified for recovering missing or altered components of the original operating system upon application of a subsequent over-the-air patch;

wherein, responsive to receiving the subsequent over-the-air patch, installing the over-the-air patch on the unitary operating system by:

booting the unitary operating system into recovery mode, reading the recovery list, and correcting the modified files by applying the over-the-air patch; and rebooting the unitary device operating system including the applied over-the-air patch.

16. The information handling device according to claim 15, wherein the additional operating system content derives from a repository within the information handling device.

* * * * *